3,553,184
PROCESS FOR THE MANUFACTURE OF COPOLYMER DISPERSIONS OF VINYL ALKANOATES/ VINYL CHLORIDES
Michael Lederer and Heinrich Koch, Frankfurt am Main, and Albrecht Harreus, Kelkheim, Taunus, Germany, assignors to Farbwerke Hoechst Aktiengesellschaft vormals Meister Lucius & Bruning, Frankfurt am Main, Germany, a corporation of Germany
No Drawing. Continuation of application Ser. No. 586,353, Oct. 13, 1966. This application Sept. 22, 1969, Ser. No. 860,123
Claims priority, application Germany, Oct. 23, 1965, F 47,500
Int. Cl. C08f *15/24*
U.S. Cl. 260—87.1                                         5 Claims

ABSTRACT OF THE DISCLOSURE

A process has been provided for the manufacture of aqueous copolymer dispersions based on vinyl chloride and vinyl esters of branched aliphatic carboxylic acids. A dispersion of improved stability is obtained by carrying out the polymerization of the monomer mixture in an aqueous solution of (a) hydroxyethyl cellulose with a $OC_2H_4$ content of 37 to 50%, (b) an oxyethylated alkyl phenol with 6 to 25 $OC_2H_4$ units in the molecule, and (c) as an ionic emulsifier, sodium lauryl sulfate.

---

This application is a continuation of Ser. No. 586,353 filed Oct. 13, 1966, now abandoned.

The present invention relates to a process for the manufacture of aqueous copolymer dispersions of high percentage on the basis of vinyl chloride and vinyl esters of branched aliphatic carboxylic acids, which dispersions are distinguished by a good compatibility with pigments and a good freeze resistance and which in the pigmented state have an excellent stability.

By compatibility with pigments there is to be understood the compatibility with dry pigments, especially with dry $TiO_2$, which means that after the addition of the dry pigments the dispersion should not coagulate. It is known that dispersion paints are generally compatible with pigments when the pigments are added in the form of aqueous pastes, occasionally with concomitant use of pigment distributors.

Coagulation often occurs when dry pigments are stirred into the dispersion paint. Dispersions containing ionic emulsifiers are especially sensitive. In industry, however, the use of dry pigments for pigmenting plastics dispersions has found wide application.

Copolymer dispersions of vinyl chloride with vinyl esters are especially sensitive to the addition of dry $TiO_2$. The sensitivity is further increased if the dispersion additionaly contains a plasticizer.

In order to improve the freeze resistance of copolymer dispersions various measures have been proposed, for example the incorporation by polymerization of a small amount of an unsaturated carboxylic acid. This measure detrimentally affects, however, the capacity to absorb water of the coating films. On the other hand, it is known that with the use of hydroxyethyl cellulose and a nonionic emulsifier, dispersions are obtained which are not resistant to sub-zero temperatures and unstable towards electrolytes. With the use of a polyvinyl alcohol as dispersing agent freeze stable dispersions are obtained, but the plasticizer-containing coatings are milky and strongly inhomogeneous. Moreover, the coatings absorb a high quantity of water.

The present invention provides a process for the manufacture of aqueous copolymer dispersions based on vinyl chloride and vinyl esters of branched aliphatic carboxylic acids in which the aforesaid disadvantages are substantially or entirely avoided. According to the invention the monomer mixture is polymerized in an aqueous solution of (a) hydroxyethyl cellulose having a $OC_2H_4$ content of 37 to 50%, preferably 40 to 47%, (b) an oxyethylated alkyl phenol, preferably nonyl phenol, with 6 to 25, advantageously 10 to 15 $OC_2H_4$ units in the molecule, and (c) an ionic emulsifier, advantageously sodium lauryl sulfate. The copolymer dispersions obtained have a very good compatibility with pigments and a high freeze resistance and in the pigmented state they have excellent storing properties.

According to a preferred mode of execution the hydroxyethyl cellulose is used in an amount of 1 to 3, advantageously 1.5 to 2.5% by weight, the oxyethylated alkyl phenol is used in an amount of 2 to 6, advantageously 2.5 to 4% by weight and the ionic emulsifier is used in an amount of 0.01 to 0.1, advantageously 0.04 to 0.08% by weight, all percentages being calculated on the monomer mixture. The hydroxyethyl cellulose has advantageously a viscosity in the range of from 5 to 400 centipoises, measured in a 2% aqueous solution. Suitable ionic emulsifiers are, for example, the alkali metal salts of monoalkylsulfuric acids and alkylsulfonic acids, especially those having 8 to 18 carbon atoms. Sodium salts and more particularly sodium lauryl sulfate are preferred.

It has been surprising that copolymer dispersions of vinyl chloride with vinyl esters of branched aliphatic carboxylic acids, especially vinyl isobutyrate, having the aforesaid advantageous properties can only be obtained with the use of a definite hydroxyethyl cellulose having a $OC_2H_4$ content of 37 to 50% in combination with a definite oxyethylated alkyl phenol containing 6 to 25 $OC_2H_4$ units in the molecule, and a minor amount of an ionic emulsifier. When, for example, in the specified dispersing system the defined hydroxyethyl cellulose is replaced by a hydroxyethyl cellulose having a $OC_2H_4$ content of 20 to 35% and a viscosity of 5 to 300 centipoises, determined in a 2% aqueous solution, considerable amounts of coagulate are formed in the dispersion on adding dry $TiO_2$ and the dispersion has a moderate freeze resistance.

The advantages of the hydroxyethyl cellulose to be used in the dispersing system according to the invention over a hydroxyethyl cellulose having a lower $OC_2H_4$ content are illustrated in the following Table I.

As a measure for the compatibility with $TiO_2$—the nature of the $TiO_2$ used is not critical—this measure is indicated by the amounts of coagulate formed when 80 grams of dry $TiO_2$ are stirred into 200 grams of an about 50% dispersion of a vinyl chloride/vinyl isobutyrate copolymer (vinyl chloride/vinylisobutyrate 40/60) containing tricesyl phosphate (TCP) as plasticizer and admixed with 18 cc. of water and 1 cc. of 25% aqueous $NH_3$ solution. The coagulate is isolated with a sieve having 1600 meshes on a square centimeter. η means the viscosity in centipoises determined in a 2% aqueous solution. Experment 1 is a comparative experiment, Experiments 2 and 3 relate to the process according to the invention.

TABLE I

| Experiment | Hydroxyethyl cellulose $OC_2H_4$, percent | η centipoises | Plasticizer TCP, percent | Coagulate, percent | Freeze resistance down to ° C. | Water absorption, percent |
|---|---|---|---|---|---|---|
| 1 | 35 | 10 | 5 | >0.1 | −5 | 3-4 |
|   | 35 | 10 | 7 | 2.8 | −5 | 3-4 |
| 2 | 41 | 163 | 5 | <0.02 | −18 | 4-5 |
|   | 41 | 163 | 7 | <0.02 | −18 | 4-5 |
| 3 | 41 | 18 | 5 | <0.02 | −18 | 5-6 |

Dispersions still having a good compatibility with pigments can be prepared, for example, by comibining a hydroxyethyl cellulose with 35% of $OC_2H_4$ and a hydroxyethyl cellulose with 41% of $OC_2H_4$ provided that the means $OC_2H_4$ content is raised to at least 37%. (Experiment A of following Table II.) When, however, two dispersions which have been prepared separately with the two hydroxyethyl celluloses specified above, are subsequently mixed, objectionable dispersions are obtained (Experiment B of following Table II).

TABLE II

| | Hydroxyethyl cellulose $OC_2H_4$ percent | Plasticizer TCP, percent | Coagulate, percent |
|---|---|---|---|
|   | 41 | 7 | 0.02 |
| A | 38 | 7 | 0.05 |
| B | 38 | 7 | 0.3 |

Suitable monomers to be used besides vinyl chloride as co-components for the manufacture of the aqueous copolymer dispersions of the invention are vinyl esters of branched chain carboxylic acids preferably having 4 to 19 carbon atoms. Vinyl isobutyrate is particularly suitable. In the copolymerization the vinyl ester is advantageously used in an amount of 30 to 95% by weight and the vinyl chloride is consequently used in an amount of 70 to 5% by weight.

As catalysts the water-soluble derivatives of hydrogen peroxides are preferably used, for example potassium persulfate, ammonium persulfate or the mixed peroxide of cyclohexyl carbonate and potassium sulfate, if desired in combination with reducing substances. It is also possible to use hydrogen peroxide in combination with a reducing agent such as ascorbic acid or sodium formaldehyde sulfoxylate. The total amount or a partial amount of the catalyst can be first introduced into the reaction vessel. In the latter case the remaining amount of the catalyst is added in the course of polymerization. To the polymerization batch there may also be added substances known for their ability to influence the molecular size (so-called regulators), for example aldehydes, mercaptans, halohydrocarbons and the like. Salts having a buffering action may be added, too, for example sodium bicarbonate and/or sodium acetate.

It is expedient to carry out polymerization at a temperature in the range of from 40 to 120° C., advantageously 65 to 95° C..

Polymerization is carried out in an autoclave which, in general, is first charged with the aqueous medium and a partial amount of the catalyst. The mixture is then heated to the required polymerization temperature, whereupon part of the monomer mixture is added. After the beginning of polymerization, the remaining amount of the monomer mixture is metered in uniformly. The remainder of the vinyl ester which has not polymerized is completely polymerized with a redox system.

The tendency to form films of the copolymers largely depends on the content of vinyl chloride. It is, therefore, necessary to add a plasticizer to dispersons containing 30% and more vinyl chloride if they are to be used as paints. Suitable plasticizers are, for example, diesters of phthalic acid or esters of phosphoric acid, tricresyl phosphate being particularly advantageous.

The dispersions prepared by the process according to the invention are suitable for producing weather resistant coats and for coating the surface of films and/or fabrics.

The following examples serve to illustrate the invention but they are not intended to limit it thereto, the parts being by weight unless otherwise stated.

EXAMPLE 1

In a polymerization vessel provided with stirrer and inserts (baffles) a solution of 100 parts of water, 2 parts of hydroxyethyl cellulose with a $OC_2H_4$ content of 41% and a viscosity of 163 centipoises (determined in a 2% aqueous solution), 2.5 parts of an oxyethylated nonyl phenol with 10 $OC_2H_4$ units in the molecule, 0.08 part of sodium lauryl sulfate, 0.01 part of $NAHCO_3$, and 0.145 part of potassium persulfate was heated at 70° C. with the exclusion of air. 10 parts of a monomer mixture consisting of vinyl chloride and vinyl isobutyrate (ratio 40:60) was forced into the autoclave. After the beginning of polymerization, further 90 parts of the monomer mixture were metered in during the course of 8 hours. A solution of 0.03 part of ammonium persulfate was then aded and the temperature was raised to 85°–90° C. When the pressure had fallen, the autoclave was cooled and polymerization was terminated with the aid of a redox system consisting of ascorbic acid and $H_2O_2$. The conversion amounted to 99.6–99.9%.

After the addition of 7% of tricresyl phosphate and 3% of hexylene glycol as plasticizer, the dispersion could be pigmented. It had a good freeze resistance (numerical data cf. Table I).

EXAMPLE 2

The experiment was carried out as described in Example 1. The hydroxyethyl cellulose used contained 41% of $OC_2H_4$ and had a viscosity of 18 centipoises in a 2% aqueous solution. The dispersion admixed with 7% of tricresyl phosphate and 3% of hexylene glycol was well compatible with dry $TiO_2$ and had a good freeze resistance (numerical values cf. Table I).

COMPARATIVE EXAMPLE

The experiment was carried out as described in Example 1, with the exception that instead of the hydroxyethyl cellulose used in the aforesaid example (41% $OC_2H_4$) a hydroxyethyl cellulose was used having an $OC_2H_4$ content of 35% and a viscosity of 10 centipoises, determined in a 2% aqueous solution. The dispersion obtained, to which 7% of tricresyl phosphate and 3% of hexylene glycol had been added as plasticizer, had a poor compatibility with dry $TiO_2$ and a moderate freeze resitsance (numerical data cf. Table I).

What is claimed is:

1. A process for the manufacturer of aqueous copolymer dispersions based on 70 percent by weight to 5 percent by weight of vinyl chloride and 30 percent by weight to 95 percent by weight of vinyl esters of branched aliphatic carboxylic acids, which comprises carrying out the polymerization of the monomer mixture in an aqueous solution of (a) hydroxyethyl cellulose with an $OC_2H_4$ content of 37 to 50%, (b) an oxyethylated alkyl phenol with 6 to 25 $OC_2H_4$ units in the molecule, and (c) as an ionic emulsifier, sodium lauryl sulfate.

2. The process of claim 1, wherein the aqueous solution contains a hydroxyethyl cellulose with an $OC_2H_4$ content of 40 to 47 percent and an oxyethylated alkyl phenol with 10 to 15 $OC_2H_4$ units in the molecule.

3. The process of claim 1, wherein the oxyethylated alkyl phenol is nonyl phenol.

4. The process of claim 1, wherein the hydroxyethyl cellulose is used in an amount of 1 to 3 percent by weight, the oxyethylated alkyl phenol is used in an amount of 2 to 6 percent by weight and the ionic emulsifier is used in an amount of 0.01 to 0.1 percent by weight, all percentages being calculated on the monomer mixture.

5. The process of claim 1, wherein the hydroxyethyl cellulose is used in an amount of 1.5 to 2.5 percent by weight, the oxyethylated alkyl phenol is used in an amount of 2.5 to 4 percent by weight and the ionic emulsifier is used in an amount of 0.04 to 0.08 percent by weight, all percentages being calculated on the monomer mixture.

References Cited
UNITED STATES PATENTS

| | | | |
|---|---|---|---|
| 3,186,974 | 6/1965 | Verberg | 260—85.7 |
| 3,231,534 | 1/1966 | Blades | 260—29.6 |
| 3,300,423 | 1/1967 | Brown | 260—17 |
| 3,370,031 | 2/1968 | Grommers | 260—29.6 |

JOSEPH L. SCHOFER, Primary Examiner

C. A. HENDERSON, Jr., Assistant Examiner

U.S. Cl. X.R.

260—17, 29.6